United States Patent
Habert

[11] 3,714,484
[45] Jan. 30, 1973

[54] ROTOR ASSEMBLY FOR USE IN A DYNAMO ELECTRIC MACHINE

[75] Inventor: Roger Jean Habert, Epinay, Seine, France

[73] Assignee: Ducellier & Cie, Paris, France

[22] Filed: March 15, 1971

[21] Appl. No.: 124,147

[30] Foreign Application Priority Data

March 16, 1970 France....................7009272

[52] U.S. Cl................................310/263
[51] Int. Cl................................H02k 1/22
[58] Field of Search...............310/263, 162–165

[56] References Cited

UNITED STATES PATENTS

| | | | |
|---|---|---|---|
| 3,184,625 | 5/1965 | Farison | 310/263 UX |
| 3,252,025 | 5/1966 | Brown et al. | 310/263 X |
| 3,271,606 | 9/1966 | Collins | 310/263 |
| 3,445,694 | 5/1969 | Campbell et al. | 310/263 X |
| 3,450,913 | 6/1969 | Baker et al. | 310/263 X |

Primary Examiner—J. D. Miller
Assistant Examiner—Mark O. Budd
Attorney—Sughrue, Rothwell, Mion, Zinn & Macpeak

[57] ABSTRACT

This invention relates to a rotor assembly for use in a dynamo electric machine, the rotor assembly having two parts which are mounted on a rotor shaft, each of the paths having a periphery a plurality of pole pieces of generally trapezoidal shape which extend in a direction substantially parallel to the axis of the rotor shaft. The pole pieces of the two paths are interdigitated and arranged such that in use the pole pieces associated with the two parts have opposite polarities, the non parallel sides of each pole piece being spaced from the adjacent sides of adjacent pole pieces and a portion of the outer face of each pole piece being of part cylindrical configuration. The outer edges of the sides of each pole piece when seen in developed plan view are inclined relative to the rotor axis by different amounts and a relieved portion is provided in the outer face adjacent to one of these edges so that the part cylindrical portion of the outer face has substantially the shape of an isosceles trapezium.

1 Claim, 8 Drawing Figures

ROTOR ASSEMBLY FOR USE IN A DYNAMO ELECTRIC MACHINE

This invention relates to a rotor assembly for use in a dynamo electric machine, said rotor assembly having two parts which are mounted in spaced apart relation on a rotor shaft and which have at their periphery a plurality of pole pieces which extend in a direction substantially parallel to the rotor shaft, the pole pieces of the two parts being inter-digitated.

In known rotors, the outer face or pole "spread" of each pole piece has approximately a trapezoidal shape and is connected by its larger end to the appropriate disc so that the adjacent sides of two adjacent pole "spreads" are parallel.

The result is that part cylindrical portions of the pole "spreads" are limited by the inter-pole leakage distance which must be maintained and this thus limits the power of the dynamo electric machine.

Furthermore in order to solve the basic problem of the noise produced when the rotor assembly rotates it is known that the outer edges of the sides of the pole pieces can be rounded off or that a recess or chamfer can be made in these edges so that in use, the clearance between the pole pieces and the stator increases as the pole pieces leave the stator teeth. This reduces the total area of the part cylindrical portions of the pole "spreads" of the pole pieces and consequently reduces the power of the dynamo electric machine.

The object of the present invention is to provide a rotor assembly in an improved form.

In accordance with the present invention there is provided a rotor assembly for use in a dynamo electric machine, said rotor assembly having two parts which are mounted on a rotor shaft, each of said parts having at their periphery a plurality of pole pieces of generally trapezoidal shape which extend in a direction substantially parallel to the axis of the rotor shaft, the pole pieces of the two parts being interdigitated and arranged such that, in use, the pole pieces associated with the two parts have opposite polarities, the non parallel sides of each pole piece being spaced from the adjacent sides of adjacent pole pieces and a portion of the outer face of each pole piece being of part cylindrical configuration, characterized in that the outer edges of the sides of each pole piece are when seen in developed plan view inclined relative to the rotor axis by different amounts and that a relieved portion is provided in said outer face adjacent to one of these edges so that said part cylindrical portion of the outer face has substantially the shape of an isoscelese trapezium.

The invention will now be more particularly described with reference to the accompanying drawings wherein.

Figure 1:
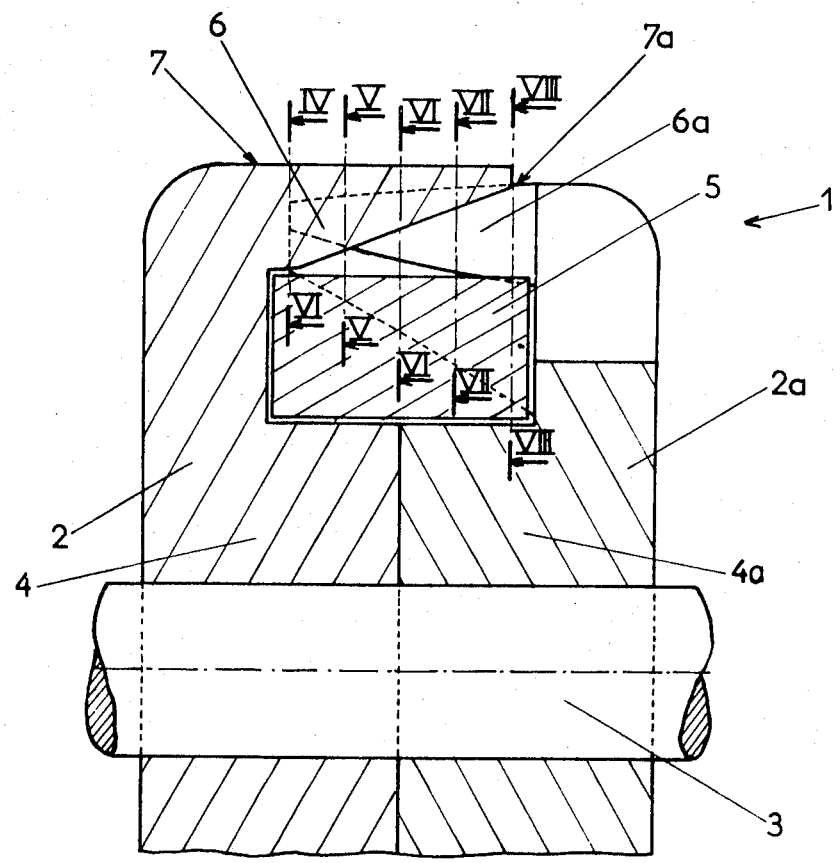
FIG. 1 shows diagrammatically an axial section of part of a rotor assembly according to the invention.
Figure 2:
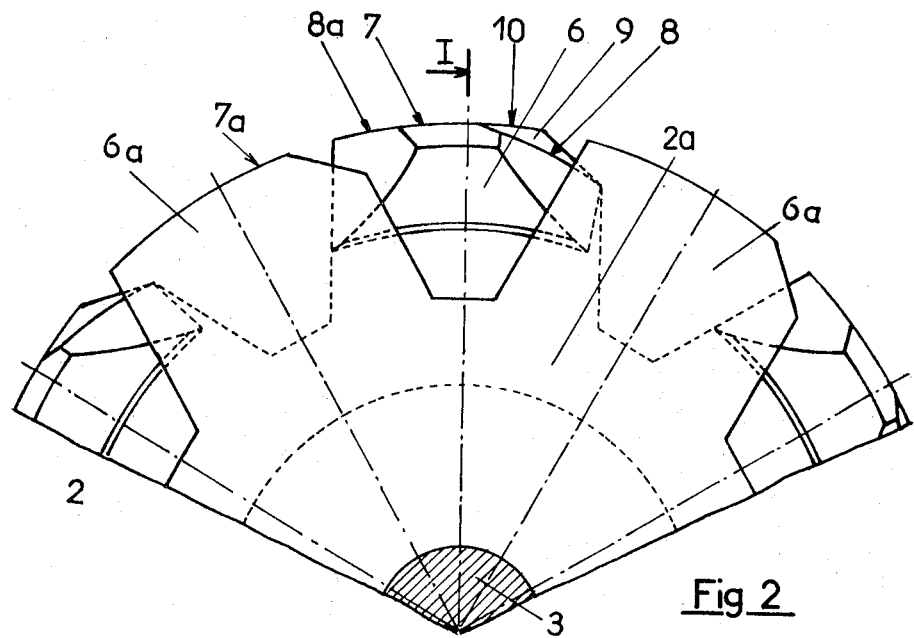
FIG. 2 is an end view of the part of the rotor assembly of FIG. 1.

Referring now to the drawings, there is shown therein a rotor assembly 1 for use in an alternator. The rotor assembly 1 as shown in FIGS. 1 and 2 has two parts each of which comprises of an identical disc portion 2, 2a mounted on a rotor shaft 3. Hub portions 4 and 4a are mounted end to end carry an energizing coil 5. The disc portion 2 has six pole pieces 6 which are uniformly distributed and which extend from the periphery of the disc portion 2 axially towards the disc portion 2a, the latter being spaced from disc portion 2 which also has six pole pieces 6a which are uniformly distributed and which extend axially from the periphery of the disc portion 2a towards the disc portion 2.

The two sets of pole pieces 6 and 6a penetrate alternately into each other to thus form an annular crown of interdigitated claws. The respective polarities of the two sets of pole pieces 6 and 6a are opposite so that the outer faces or pole "spreads" 7 and 7a of adjacent pole pieces 6 and 6a present opposed polarities to the alternator stator slots. It can be seen by referring to FIG. 2 that the pole pieces 6 and 6a have a generally trapezoidal shape and are connected by their larger end to the associated disc portions 2 and 2a. The outer edges 8 and 8a of the sides of each of the pole pieces 6 and 6a have a different slope relative to the rotor axis, the edge 8 corresponding to the flux outlet being more oblique than the edge 8a corresponding to the flux inlet with respect to the axis of the pole piece.

In order to solve the basic problem of noise, flux outlet reliefs 9 are formed adjacent the outer edges 8 of the pole pieces 6 and 6a. These reliefs 9 have a shape and a slope relative to the part cylindrical portions of the pole spreads 7 and 7a such that they define by a different slope of the adjacent edges 8 and 8a of two adjacent pole pieces 6 and 6a, a leakage distance D which is approximately constant between the part cylindrical portions of the outer surfaces of adjacent pole pieces over the axial length of the latter.

Figure 3:
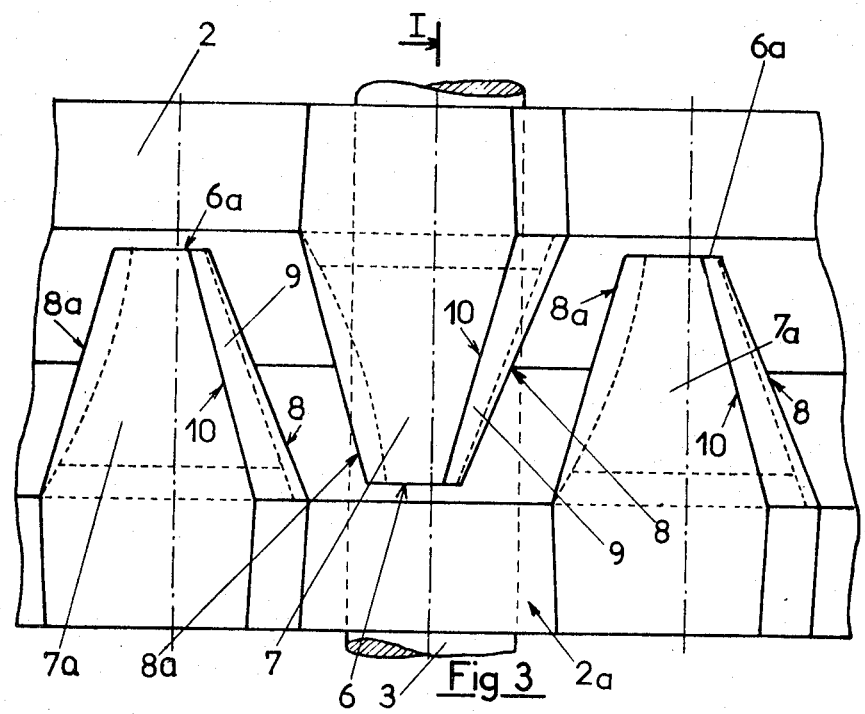
FIG. 3 shows diagrammatically a developed view of some of the pole pieces of the rotor assembly shown in FIGS. 1 and 2.
Figure 4:
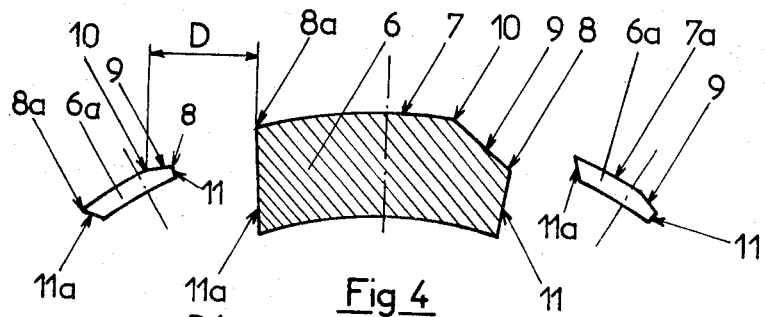
FIGS. 4 to 8 show diagrammatically sectional views of three consecutive pole pieces taken along the lines IV—IV to VIII—VIII of FIG. 1 respectively.
Figure 5:
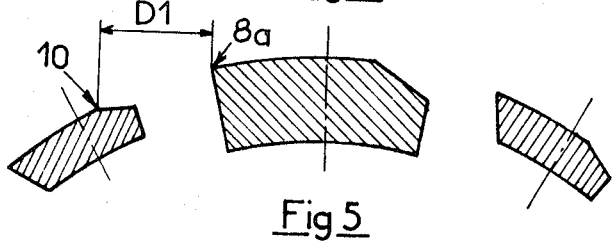
Figure 6:
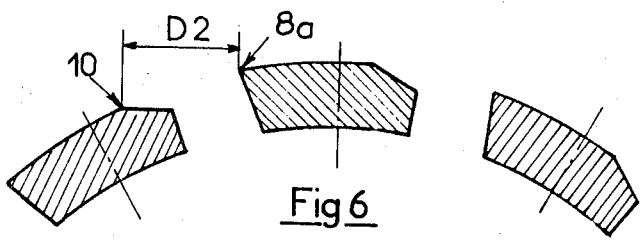
Figure 7:
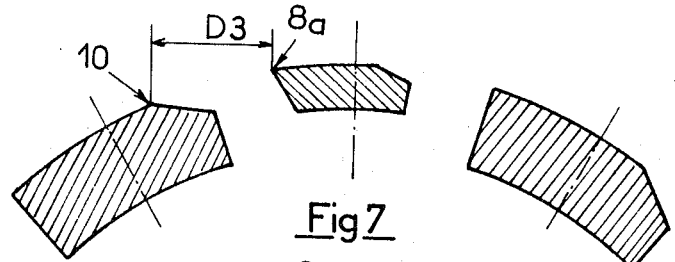
Figure 8:
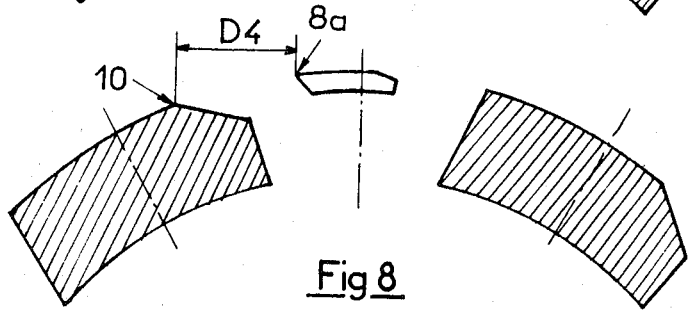

Referring more particularly to FIGS. 4 to 8, the distance D (FIG. 4) is approximately equal to D1, D2, D3, D4 (FIGS. 5, 6, 7 and 8 respectively) and these distances D1 to D4 are approximately equal to each other. Seen in FIG. 3 this can be translated by the fact that the edge 10 (intersection of the relief 9 with the part cylindrical surface portion of a pole "spread") is generally parallel to the flux entry edge 8a of an adjacent pole piece.

The part cylindrical portions of the pole "spreads" 7 and 7a, which remain after formation of the relieve 9 have (see in FIG. 3), the approximate shape of an isoscelese trapezeium, the non parallel edges of which are defined respectively by the edge 8a of the pole pieces 6 and 6a and by the edge 10.

Furthermore, as shown in FIGS. 4 to 8, sides 11 and 11a of the pole pieces 6 and 6a bounded at the top by the outer edges 8 and 8a have a variable inclination along the length of the pole pieces relative to the outer face of the associated pole piece such that the leakage distance between the sides 11 and 11a of two adjacent pole pieces 6 and 6a are relatively constant throughout the length of said pole pieces.

The shape given to the pole pieces as hereinbefore described has been found to be the best compromise as far as "the noise" produced by the alternator and the power produced by the alternator are concerned and also in respect of any additional losses.

Having thus described my invention what I claim as new and desire to secure by Letters Patent is:

1. In a rotor assembly for use in a dynamo electric machine, said rotor assembly including a rotor shaft, two parts which are mounted on the rotor shaft and a plurality of pole pieces at the periphery of each of said parts, said pole pieces being of generally trapezoidal shape which extend in a direction substantially parallel to the axis of the rotor shaft, the pole pieces of the two parts being inter-digitated and arranged such that, in use, the pole pieces associated with the two parts have opposite polarities, the non-parallel sides of each pole piece being spaced from the adjacent sides of adjacent pole pieces and a portion of the outer face of each pole piece being of part cylindrical configuration, the improvements comprised by:

a. the outer edges of each pole piece when seen in developed plan view being inclined relative to the rotor axis by different amounts, b. an abrupt relieved portion being provided in said outer face adjacent to one of these edges to define a further edge between the relieved portion and said part cylindrical portion so that said part cylindrical portion of the outer face has substantially the shape of an isosceles trapezium, and c. the outer edge of each pole piece having an undercut relief whose inclination relative to the outer face of that pole piece varies along the length of the latter so that the flux leakage distance between said edge and the adjacent edge of the adjacent pole piece remains substantially constant over the length of the pole piece.

* * * * *